United States Patent
Östrup et al.

(10) Patent No.: US 9,100,812 B2
(45) Date of Patent: Aug. 4, 2015

(54) METHOD AND APPARATUS FOR ENABLING PRIVILEGED ACCESS IN A CELLULAR NETWORK

(75) Inventors: Peter Östrup, Linkoping (SE); Bengt Jonsson, Linkoping (SE); Johan Westling, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/114,498

(22) PCT Filed: May 4, 2011

(86) PCT No.: PCT/SE2011/050558
§ 371 (c)(1),
(2), (4) Date: Oct. 28, 2013

(87) PCT Pub. No.: WO2012/150882
PCT Pub. Date: Nov. 8, 2012

(65) Prior Publication Data
US 2014/0057588 A1 Feb. 27, 2014

(51) Int. Cl.
*H04M 11/04* (2006.01)
*H04W 72/00* (2009.01)
*H04W 4/22* (2009.01)
*H04W 28/26* (2009.01)
*H04W 76/00* (2009.01)

(52) U.S. Cl.
CPC .............. *H04W 4/22* (2013.01); *H04W 28/26* (2013.01); *H04W 76/007* (2013.01)

(58) Field of Classification Search
None
See application file for complete search history.

(56) References Cited

U.S. PATENT DOCUMENTS

| | | | |
|---|---|---|---|
| 5,862,485 A | 1/1999 | Linneweh, Jr. et al. | |
| 2005/0048984 A1* | 3/2005 | Foster et al. | 455/453 |
| 2006/0040671 A1* | 2/2006 | Takarabe | 455/450 |
| 2009/0143046 A1 | 6/2009 | Smith | |
| 2011/0053553 A1 | 3/2011 | Lambert et al. | |
| 2011/0151885 A1* | 6/2011 | Buyukkoc et al. | 455/452.1 |

FOREIGN PATENT DOCUMENTS

| | | |
|---|---|---|
| CA | 2 303 716 A1 | 4/2000 |
| EP | 1045604 A2 | 10/2000 |
| EP | 1045604 A3 | 4/2001 |

OTHER PUBLICATIONS

International Search Report, PCT/SE2011/050558, Feb. 7, 2012.
Written Opinion of the International Searching Authority, PCT/SE2011/050558, Feb. 7, 2012.

* cited by examiner

*Primary Examiner* — Erika A Washington
(74) *Attorney, Agent, or Firm* — Myers Bigel Sibley & Sajovec, P.A.

(57) ABSTRACT

Method and apparatus in a reservation function associated with a base station serving a cell in a cellular network, for enabling access for privileged sessions in the cell. When detecting that resources being pre-reserved for privileged sessions, are used for establishing a connection for a privileged session for a wireless terminal, the reservation function pre-reserves new resources exclusively for privileged sessions to compensate for the resources occupied by the established privileged session connection in a dynamic manner. Thereby, an amount of resources sufficient for enabling at least one subsequent privileged session connection remains pre-reserved in the base station.

16 Claims, 2 Drawing Sheets

METHOD AND APPARATUS FOR ENABLING PRIVILEGED ACCESS IN A CELLULAR NETWORK

CROSS REFERENCE TO RELATED APPLICATION

This application is a 35 U.S.C. §371 national stage application of PCT International Application No. PCT/SE2011/050558, filed on 4 May 2011, the disclosure and content of which is incorporated by reference herein in its entirety. The above-referenced PCT International Application was published in the English language as International Publication No. WO 2012/150882 A1 on 8 Nov. 2012.

TECHNICAL FIELD

The invention relates generally to a method and an apparatus for enabling access to a cellular network for privileged or prioritized communication sessions such as emergency calls.

BACKGROUND

It is a well-known fact that in a cellular network, the number of simultaneous communication sessions with terminals in a specific area of a cell being served by a base station, is limited due to a limited supply of communication resources in the network. These restrictions primarily refer to bandwidth allocated for radio communication in the cell but may also pertain to various equipment available in the base station for providing the radio communication. Network operators typically control the radio communication in their cells by allocating a certain amount of bandwidth to individual cells, often referred to as cell planning or frequency planning which may be fixed or more or less dynamically adaptive over time. If the radio traffic in the cell is dense and more sessions are established, it may happen that all bandwidth allocated to the cell becomes occupied with sessions such that no further sessions can be admitted in the cell. Another limiting factor is also the level of radio interference in the cell and its surrounding cells, which should not be allowed to exceed certain limits to ensure proper radio communication in the cell.

It is generally required that emergency calls and other privileged or prioritized sessions must still be admitted, should it become necessary, even in the congested situation described above. In this description, the term "privileged session" will be used to represent any call or other communication session that is deemed to be of higher importance or priority over other non-privileged calls and sessions of no particular importance or priority, referred to as "non-privileged sessions" which thus have no precedence over any other sessions. Some typical examples of such privileged sessions are emergency calls when users in the cell dial a specific emergency number, such as 112 or 911, and communication sessions from or to parties of particular priority such as persons working for public safety and law enforcement, e.g. the police.

When an access request for an emergency call or other privileged session is made in a congested cell, a conventional and obvious solution for the network is to "throw out" an ongoing session of inferior priority in the cell by simply terminating that session and releasing the resources used in the session, to make room for the emergency call. However, this procedure is generally deemed undesirable since the user of the thrown-out session will most likely perceive this action of forcibly ending the call rather annoying and unacceptable. In fact, some countries and regions do not accept or even allow that calls and sessions are thrown out and forcibly terminated in this way.

In this context, it is generally deemed a better solution, at least from the users' viewpoint, to keep resources at the base station reserved in advance exclusively for emergency calls in the cell, to ensure that whenever access for an emergency call is requested there will be enough communication resources free to use for that call with a minimum of delay. Typically, it is not sufficient to pre-reserve resources in this way for just one emergency call but resources must be pre-reserved for a number of such calls, to guarantee the admission of, say, three or four emergency calls at any time, e.g. in the case of an accident. This may even be an official requirement in some countries and regions.

"Pre-reserved" resources means that the resources are set aside and cannot be used for other than privileged sessions. Currently, it is proposed that the network operator decides how much resources to pre-reserve for privileged sessions in each cell, which is done by configuring various resource-related parameters in the respective base stations. A basic requirement is thus to always provide access for privileged sessions in cellular networks.

However, there are some problems and drawbacks associated with the above-described pre-reservation of resources for a number of privileged sessions. Firstly, if each and every cell in a network with numerous cells must keep unoccupied resources reserved for privileged sessions at any time, much capacity in the network will surely go unused since it is very unlikely that a considerable amount of pre-reserved resources will be used for privileged sessions at the same time. Further, an emergency situation typically occurs during a limited time and in a rather limited area, perhaps within a single cell, although which cell that would be cannot be foreseen which is why every cell must have pre-reserved resources just in case. For example, if a network with 10,000 cells and corresponding base stations must pre-reserve resources for three privileged sessions in each cell, resources for a total of 30,000 calls will be practically wasted and go unused. As a result, the wireless networks must be designed with capacity of great excess in relation to the used capacity, which is naturally quite expensive.

Secondly, there may be situations when those pre-reserved resources to guarantee three or four privileged sessions in each cell is still not enough locally, e.g. when a major accident happens and there is need for several emergency calls and calls from/to privileged persons working with the accident and others. Thirdly, considerable efforts are required for configuring each and every cell with surplus resource capacity to make room for a plurality of privileged sessions, should that ever be needed.

SUMMARY

It is an object of the invention to address at least some of the problems and shortcomings outlined above. It is possible to achieve these objects and others by using a method and an entity denoted reservation function, as defined in the attached independent claims. The term "reservation function" is thus used throughout this description to represent the inventive apparatus, although other terms may alternatively be used, such as "reservation unit", "resource manager", "resource reserving unit", and so forth.

According to one aspect, a method is provided in a reservation function associated with a first base station that serves a cell in a cellular network, for enabling access to the first base station for privileged sessions. In this method, the reservation function detects that resources, which have been pre-reserved in the first base station exclusively for privileged sessions, are used for establishing a connection for a privileged session for a wireless terminal in the cell. In response to detecting the above pre-reservation, the reservation function further pre-reserves new resources in the first base station exclusively for privileged sessions, to compensate for the resources occupied by the established privileged session connection, such that an amount of resources sufficient for enabling at least one subsequent privileged session connection remains pre-reserved in the first base station.

According to another aspect, a reservation function is provided which is associated with a first base station serving a cell in a cellular network. The reservation function is configured to enable access to the first base station for privileged sessions as follows. The reservation function comprises a detecting module adapted to detect that resources, which have been pre-reserved in the first base station exclusively for privileged sessions, are used for establishing a connection for a privileged session for a wireless terminal. The reservation function also comprises a reserving module adapted to pre-reserve new resources in the first base station exclusively for privileged sessions in response to said detecting, to compensate for the resources occupied by the established privileged session connection, such that an amount of resources sufficient for enabling at least one subsequent privileged session connection remains pre-reserved in the first base station.

By using the above method and reservation function, new resources are pre-reserved in the base station for privileged sessions as soon as it is detected that resources have been seized for a privileged session connection, to compensate for the seized resources in a dynamic manner. As a result, it is possible to ensure that there is always a sufficient amount of such pre-reserved and unused resources for at least one subsequent privileged session connection, while still keeping no more than a minimum of resources unavailable for other non-privileged sessions in the cell. It is an advantage that resources in the base station can thus be utilised effectively for serving sessions in the cell, which can provide much additional capacity in a network with numerous cells as compared to conventional pre-reservation procedures.

The above method and reservation function may be configured and implemented according to different optional embodiments. In one possible embodiment, the establishment of the privileged session connection may be detected based on an information element, received from either the terminal or from a core network, which indicates a privileged session. The information element may be a new parameter or an existing parameter, e.g. an EstablishmentCause information element in a connection request message from the wireless terminal, or an Allocation/Retention Priority, ARP, from a core network which indicates a relative importance of a radio bearer of the privileged session as compared to other radio bearers used in the cell.

In another embodiment, the above information element indicating a privileged session may be sent from the first base station to a second base station during handover signalling when the wireless terminal moves to a new cell served by the second base station, as a basis for performing the above actions of detecting and pre-reserving in the second base station.

Pre-reserving the new resources may comprise pre-reserving at least one of: radio interface bandwidth, transport network bandwidth, hardware equipment in the base station, a software license, a communication channel, and a Radio Access Bearer (RAB) element. However, the solution is not limited to these examples of resources.

In this method, the resources used for the detected privileged session connection for the wireless terminal can further be released once the privileged session is finished, to make those resources available for non-privileged sessions or for further pre-reservation for privileged sessions.

If the amount of unoccupied resources in the first base station is insufficient to compensate for the resources occupied by the established privileged session connection, pre-reserving the new resources in the first base station may comprise releasing an ongoing connection with the first base station or waiting until an ongoing session in the cell is completed. In the former case, the ongoing connection may be selected for release based on a level of activity of the ongoing connection, e.g. in terms of communicated data or speech. For example, if a period of inactivity in a session exceeds a preset duration, that session may be selected for release. If all ongoing sessions in the cell are setup for privileged sessions, the ongoing connection may be selected for release also based on priorities which have been set for the privileged sessions and their connections in the cell.

In further possible embodiments, the amount of pre-reserved resources in the first base station may be configurable according to a predefined condition which may pertain to the number of privileged sessions that have been requested within a configurable preset time period.

After initially setting up or activating the first base station, resources may be pre-reserved for privileged sessions in the base station for the first time when detecting that a first privileged session connection has been established with the base station. Thereby, no resources will be pre-reserved and unavailable for non-privileged sessions until a privileged session occurs in the cell for the first time.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
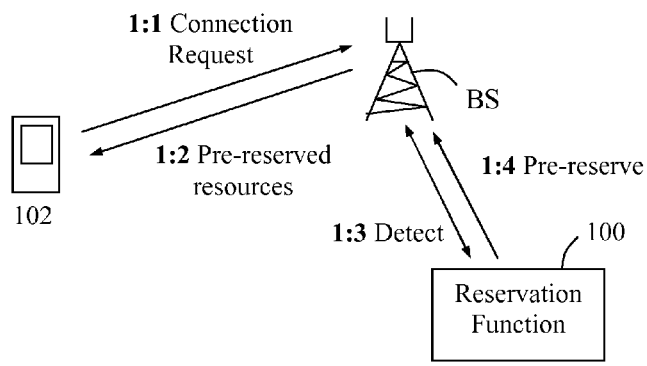
FIG. 1 is a communication scenario illustrating how resources can be pre-reserved in a base station by means of a reservation function, according to a possible embodiment.

Briefly described, a solution is provided to enable establishment of connections for wireless terminals to a base station for privileged sessions in a cell of a cellular network, without requiring that enough resources, needed to satisfy all of a stipulated minimum number of privileged sessions, are constantly being set aside for such sessions and thus being unavailable for other non-privileged sessions.

By pre-reserving new resources of the base station exclusively for privileged sessions as soon as it is detected that resources have been seized for a privileged session connection, to compensate for the seized resources in a dynamic manner, the amount of such pre-reserved and unused resources can at all times remain sufficient for at least one subsequent privileged session connection. If further privileged session connections are established subsequently by seizing pre-reserved resources, this mechanism can be used to ensure that there are always enough resources pre-reserved and readily available for at least one more privileged session connection until all resources are exhausted in the cell, still keeping a minimum of resources unavailable for other non-privileged sessions in the cell.

In one optional embodiment, resources are pre-reserved for at least one more privileged session connection even when all resources are currently used in the cell, by releasing an ongoing connection with relatively low activity such as when no or little data has been transmitted lately, which will be further described later below. Initially, pre-reserving resources for privileged sessions in a base station for the first time may be triggered when detecting that a first privileged session connection has been established with the base station, i.e. since the base station was set up and/or activated. Thereby, these resources will not be unavailable for other non-privileged sessions longer than necessary, while establishment of the very first privileged session connection according to this embodiment may be somewhat delayed if the cell is congested and no unused resources are available at the moment.

In this way, the process of setting up a privileged session once requested for a terminal is also much quicker when using pre-reserved and unoccupied resources, as compared to when occupied resources must be released first, thus providing better service for end-users. In this description, the term "resources" is used to represent any equipment, functionality or capacity available to the base station and needed to serve a communication session for a wireless terminal. By way of some non-limiting examples, such resources may refer to any one or more of: radio interface bandwidth, transport network bandwidth, hardware equipment in the base station, software licenses, communication channels, and Radio Access Bearer (RAB) elements. All these resources and others are typically in limited supply at each base station of a cellular network. A resource referring to radio interface bandwidth may e.g. be a physical radio channel determined by frequency, timeslot, code, or any combination thereof, depending on the access technology used.

It should be noted that the resources may be provided within or outside the actual base station, and in this context each resource may logically be controlled by a "resource owner" or the like. In this description, the phrase "resources in the base station" should be understood in a broad sense to represent any resources associated with the base station, either within or outside it. Moreover, a session with a wireless terminal is deemed privileged if it is directed to a privileged or prioritized number, such as an emergency number, or if it involves a party being classified as privileged and having priority over others, such as persons working for public safety, medical service, law enforcement, military service, etc. The privileged session may further involve uplink or downlink transmissions, or both, and the session may originate or terminate in the terminal present in the base station's cell.

An example of how this solution can be used will now be described with reference to the communication scenario in FIG. 1, where a base station BS provides connections with wireless terminals in a cell, e.g. according to any current communication standard such as the Global System for Mobile communication (GSM), Universal Mobile Telecommunications System (UMTS), Long Term Evolution (LTE), etc. The solution is realised by means of a "reservation function" 100 which is associated with the base station BS, e.g. by being integrated in the base station or otherwise connected thereto. For example, reservation function 100 may be associated with and connected to more than one base station, or may operate exclusively for the sole base station BS, depending on the implementation. In this solution, it can be assumed that there are unoccupied resources available to the base station BS, that have been pre-reserved for at least one privileged session connection, i.e. the very first pre-reservation described above has been made at some point earlier.

A first action 1.1 illustrates that a wireless terminal 102 makes a connection request for an emergency call, as an example of a privileged session. The connection request may include an information element that basically indicates a privileged session. For example, the connection request may be a Radio Resource Control (RRC) message called "RRC connection request" or similar, depending on the standard used. Further, the base station may identify the requested session as being privileged by checking whether an information element in the request called "EstablishmentCause" indicates a privileged session, e.g. "EstablishmentCause=emergency", or similar. The session may also be identified as privileged by a number being called such as an emergency number, e.g. 112 or 911, or by priority information received from a core network, e.g. a parameter called "Allocation Retention Priority, ARP".

In a next action 1:2, the base station BS seizes resources needed for the emergency call from the resources being pre-reserved for privileged sessions, and establishes the connection with the terminal 102 using the seized resources. In more detail, the base station may basically send a seizure request to a resource owner of each resource needed for the call, and the resource owners then return pre-reserved resources accordingly. As said above, it is assumed that the current amount of pre-reserved resources is sufficient to serve at least the requested call. The process of seizing pre-reserved resources at the base station for the emergency call may be a conventional one, e.g. depending on the implementation and configuration of the base station, which is somewhat outside the scope of this solution.

The reservation function 100 is configured to detect, in a further action 1:3, that a connection for the emergency call is established for a terminal 102 using the seized pre-reserved resources, i.e. as described for action 1:2 above. The establishment of the privileged session connection can be detected in different alternative ways. For example, the connection establishment may be detected based on the above-mentioned information element, which may come from either the terminal or from a core network, which thus indicates a privileged session. For example, this information element may be the above-mentioned EstablishmentCause information element which is typically included in connection request messages such as the request from the wireless terminal in action 1:1, or the above-mentioned ARP parameter which indicates a relative importance of a radio bearer of the privileged session as compared to other radio bearers used in the cell.

ARP is thus a parameter that is sent from the core network to the base station when setting up a radio bearer for a session. The ARP parameter is typically used in Universal Mobile Telecommunications Systems (UMTS) as well as in GSM/EDGE Radio Access Networks (GERAN), Universal Terrestrial Radio Access Networks (UTRAN) and Long Term Evolution (LTE). Alternatively, the information element indicating a privileged session may be a new parameter defined for this solution, provided by either the terminal or the core network.

In a next action 1:4, the reservation function 100 pre-reserves new resources for the first base station exclusively for privileged sessions in response to the detecting of action 1:3, to compensate for the resources now occupied by the established privileged session connection. If there are currently not enough free resources available, e.g. due to congestion in the cell, the pre-reservation of new resources may be delayed temporarily until enough resources eventually become available. As a result, an amount of resources sufficient for enabling at least one subsequent privileged session connection, will remain pre-reserved and unoccupied in the first base station as soon as the pre-reservation of new resources has been made.

At some point later, the resources used for the detected privileged session connection for the wireless terminal 102 are released once the privileged session is finished, to make those resources available for non-privileged sessions or for further pre-reservation for privileged sessions. In this solution, the pre-reservation of resources is thus made in a dynamic manner such that the amount of resources unavailable for non-privileged sessions can be kept at a minimum.

The above procedure may be implemented in different ways depending on the current situation. For example, if the current amount of available and unoccupied resources of the first base station is insufficient for compensating for the resources occupied by the established privileged session connection and for pre-reserving new resources according to the above, e.g. if the current traffic is dense in the cell occupying virtually all resources of the base station, the new resources can be pre-reserved by actively releasing an ongoing connection with the first base station to obtain new unoccupied resources. In that case, the ongoing connection may be selected for release based on a level of activity of the ongoing connection. For example, if an ongoing data session has been inactive for more than a preset duration, this session can be selected for release assuming that no further activity is expected in the near future in that session. Alternatively, the new resources can be pre-reserved somewhat later by waiting until an ongoing session is finished and enough resources eventually become available, as mentioned above.

In another situation, all ongoing sessions in the cell may have been setup for privileged sessions, e.g. if a major accident or the like has occurred. In that case, an ongoing connection may be selected for release based on priorities which have been set for the privileged sessions and their connections in the cell. The base station may thus have a function that assigns a priority to each ongoing privileged session in the cell, e.g. by setting a highest priority for calls by medical service personnel, a lower priority for calls by food supply personnel, and so forth.

Further, the amount of pre-reserved resources of the first base station may be configurable depending on the situation and according to a predefined condition which may pertain to the number of privileged sessions that have been requested recently, e.g. within a configurable preset time period. For example, if no more than one privileged session has been requested the last 24 hours, the predefined condition may dictate that resources are pre-reserved for enabling one subsequent privileged session connection, while if the number of requested privileged session the last 24 hours is between two and five, resources must be pre-reserved for enabling two subsequent privileged session connections, and so forth.

Figure 2:
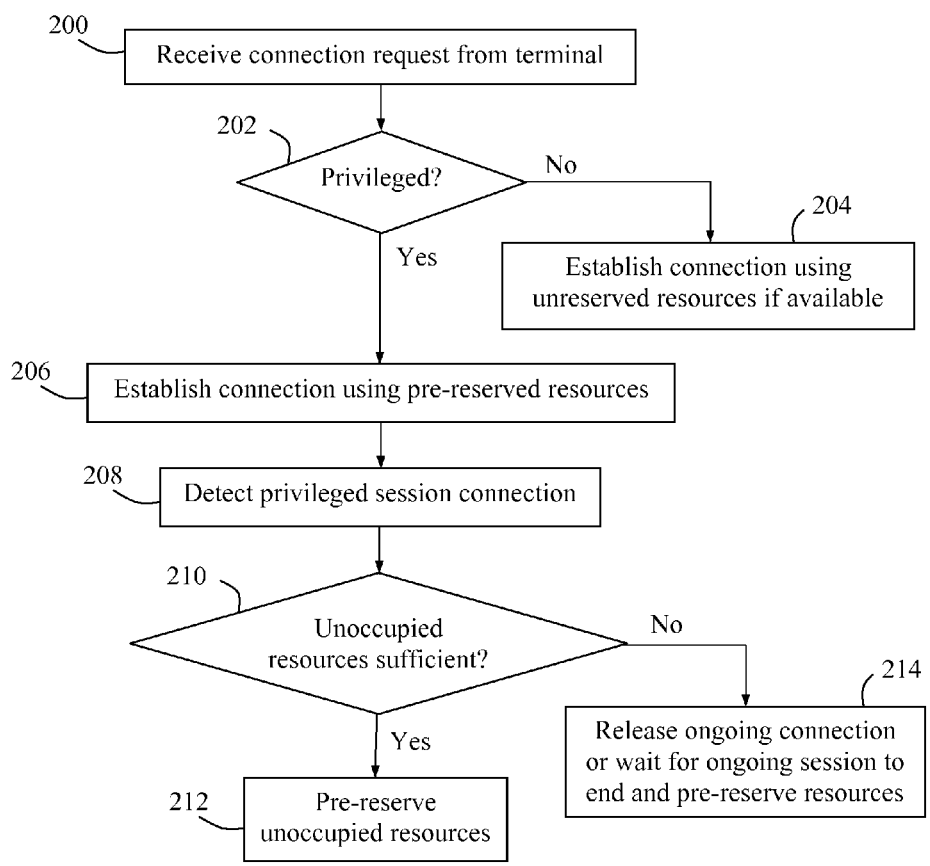
FIG. 2 is a flow chart illustrating a procedure for handling resources in a base station, according to further possible embodiments.

A procedure with actions executed in a reservation function and in an associated base station serving a cell in a cellular network, for enabling access to the first base station for privileged sessions, will now be described with reference to the flow chart in FIG. 2. The reservation function and the base station may be configured to basically operate in the manner described for FIG. 1 above. Again, It is assumed that there are sufficient unoccupied resources available to the base station, that have been pre-reserved for at least one privileged session connection.

In a first shown action 200, the base station receives a connection request from a wireless terminal, corresponding to action 1:1 above. The base station then determines whether the received connection request refers to a privileged session or not in a following action 202. If not, the base station can establish a connection for the terminal in a further action 204 by using unreserved resources, provided that such resources are currently available for the base station. This action is somewhat outside the scope of this solution and is therefore not necessary to describe as such in more detail.

If it was determined in action 202 that the connection request refers to a privileged session, the base station establishes a connection for the terminal, in another action 206, by using resources that have been pre-reserved in the first base station exclusively for privileged sessions, corresponding to action 1:2 above. In a further action 208, the reservation function detects that the base station uses such pre-reserved resources for establishing the connection for a privileged session for the terminal, corresponding to action 1:3 above. For example, this action may be implemented in practice by a notification function or the like in the base station configured to notify the reservation function in a suitable manner whenever pre-reserved resources are used for establishing a privileged session connection.

The reservation function then determines, in a further action 210, whether the amount of unoccupied resources of the first base station is sufficient to compensate for the resources occupied by the established privileged session connection or not. If there are sufficient unoccupied resources, the reservation function uses the unoccupied resources to pre-reserve new resources exclusively for privileged sessions, in an action 212. On the other hand, if there are not sufficient unoccupied resources currently at the base station, e.g. in the case of dense traffic in the cell, the new resources are pre-reserved either by releasing an ongoing connection with the first base station or by waiting until an ongoing session in the cell ends or is completed, as shown in a final action 214. Either of actions 212 and 214, whichever occurs, corresponds to action 1:4 above. Pre-reserving new resources as of action 212 or action 214 may comprise pre-reserving at least one of: radio interface bandwidth, transport network bandwidth, hardware equipment in the base station, a software license, a communication channel, and a Radio Access Bearer (RAB) element.

Figure 3:
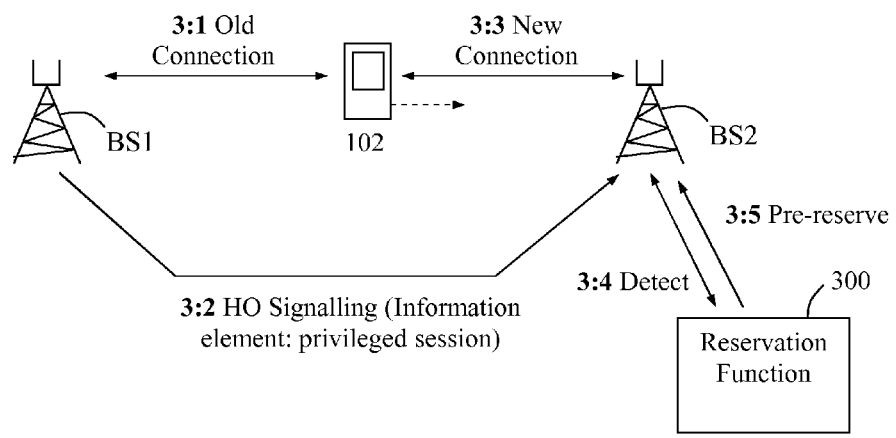
FIG. 3 is a communication scenario illustrating how resources can be pre-reserved in a base station in the case of a handover, according to another possible embodiment.

The above-described solution can also be utilised in a handover situation when a wireless terminal has established a connection for a privileged session in one cell and moves into another cell during the session, which will be described in more detail with reference to FIG. 3. In this example, a terminal 102 is first connected to a first base station BS1 and is engaged in a privileged session, as shown in a first action 3:1 denoted "old connection".

The terminal 102 then moves away from BS1 into a coverage area of a second base station BS2, as indicated by the dashed arrow, which is noticed in a conventional manner by BS1 e.g. according to a regular handover procedure such as using measurements on neighbouring base stations performed by the terminal and reported to BS1. As mentioned above, the establishment of the privileged session connection can be detected based on an information element, received from either the terminal or from a core network, which indicates a privileged session. A next action 3:2 illustrates that BS1 performs handover signalling with BS2 and transfers that information element, e.g. any of the above-described parameters EstablishmentCause and ARP, to BS2, informing the latter on the privileged session such that the new connection with BS2, shown as action 3:3, will be classified as a privileged session connection as well. Thereby, a corresponding reservation function 300 associated with BS2 is able to execute a detecting action 3:4 and a pre-reserving action 3:5 based on the received information element, in the same manner as the above-described actions 1:3 and 1:4, which are thus not necessary to describe again here.

Figure 4:
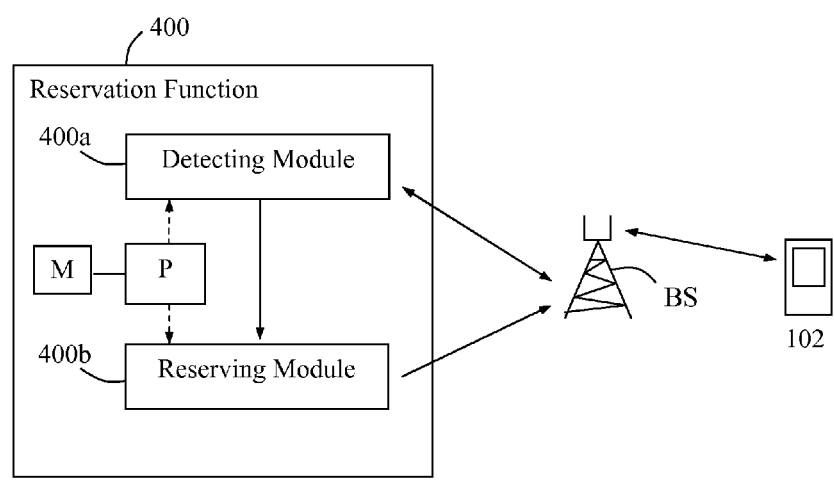
FIG. 4 is a block diagram illustrating a reservation function in more detail, according to further possible embodiments.

A detailed but non-limiting example of how a reservation function 400 can be configured to accomplish the above-described solution, is illustrated by the block diagram in FIG. 4. The reservation function 400 is associated with a first base station BS serving a cell in a cellular network, and function 400 is configured to enable access for privileged sessions, e.g. in the manner described above for any of FIGS. 1-3.

The reservation function 400 comprises a detecting module 400a adapted to detect that resources being pre-reserved in BS exclusively for privileged sessions, are used for establishing a connection for a privileged session for a wireless terminal 102. The reservation function further comprises a reserving module 400b adapted to pre-reserve new resources in BS exclusively for privileged sessions in response to said detecting, to compensate for the resources occupied by the established privileged session connection, such that an amount of resources sufficient for enabling at least one subsequent privileged session connection remains pre-reserved in BS.

It should be noted that FIG. 4 merely illustrates various functional modules or units in the reservation function 400 in a logical sense, although the skilled person is free to implement these functions in practice using suitable software and hardware means. Thus, this aspect of the solution is generally not limited to the shown structures of the reservation function 400, while their functional modules 400a and 400b may be configured to operate according to the features described for any of FIGS. 1-3 above, where appropriate.

The functional modules 400a and 400b described above can be implemented in the reservation function 400 as program modules of a respective computer program comprising code means which, when run by a processor "P" in the reservation function 400 causes the function 400 to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

The computer program may be carried by a computer program product in the reservation function 400 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the reservation function 400.

The above reservation function 400 and functional modules 400a and 400b may be configured or adapted to operate according to various optional embodiments. For example, in one possible embodiment, the detecting module 400a is further adapted to detect the establishment of the privileged session connection based on an information element indicating privileged session, e.g. the EstablishmentCause in a connection request message from the wireless terminal, or an ARP from a core network.

The reservation function 400 may further be adapted to send the privileged session information element during handover signalling to a second base station, not shown, when the wireless terminal moves to a new cell served by the second base station, as a basis for performing the above actions of detecting and pre-reserving in the second base station by means of similar detecting and reserving modules 400a, 400b.

If the amount of unoccupied resources in BS is insufficient to compensate for the resources occupied by the established privileged session connection, the reservation function 400 may be further adapted to pre-reserve the new resources in BS by releasing an ongoing connection with BS or by waiting until an ongoing session in the cell is completed. In the former case, the reservation function 400 may be further adapted to select the ongoing connection for release based on a level of activity of the ongoing connection, as described above. In another possible case where all ongoing sessions in the cell are setup for privileged sessions, the reservation function 400 may be further adapted to select the ongoing connection for release based on priorities which have been set for the privileged sessions and their connections in the cell.

While the invention has been described with reference to specific exemplary embodiments, the description is generally only intended to illustrate the inventive concept and should not be taken as limiting the scope of the invention. For example, the terms "reservation function", "base station", "wireless terminal", "privileged session", "resources" and "pre-reserve" have been used throughout this description, although any other corresponding nodes, functions, and/or parameters could also be used having the features and characteristics described here. The invention is defined by the appended claims.

The invention claimed is:

1. A method in a reservation function associated with a first base station serving a cell in a cellular network, for enabling access to the first base station for privileged sessions, the method comprising:
   detecting that resources being pre-reserved in the first base station exclusively for privileged sessions are used for establishing a connection for a privileged session for a wireless terminal, and
   pre-reserving new resources in the first base station exclusively for privileged sessions in response to said detecting, to compensate for the resources occupied by the established privileged session connection, such that an amount of resources sufficient for enabling at least one subsequent privileged session connection remains pre-reserved in the first base station,
   wherein the detecting is based on one of an EstablishmentCause information element in a connection request message from the wireless terminal, or an Allocation/Retention Priority, ARP, parameter from a core network which indicates a relative importance of a radio bearer of said privileged session as compared to other radio bearers used in the cell,
   wherein the EstablishmentCause information element is a parameter indicating the privileged session in the connection request message.

2. The method according to claim 1, further comprising sending said information element during handover signalling to a second base station when the wireless terminal moves to a new cell served by the second base station, as a basis for performing said actions of detecting and pre-reserving in the second base station.

3. The method according to claim 1, wherein pre-reserving said new resources comprises pre-reserving at least one of: radio interface bandwidth, transport network bandwidth, hardware equipment in the base station, a software license, a communication channel, and a Radio Access Bearer (RAB) element.

4. A method according to claim 1, further comprising releasing the resources used for the detected privileged session connection for the wireless terminal once the privileged session is finished, to make said resources available for non-privileged sessions or for further pre-reservation for privileged sessions.

5. The method according to claim 1, wherein said amount of pre-reserved resources in the first base station is configurable according to a predefined condition.

6. The method according to claim 5, wherein the predefined condition pertains to the number of privileged sessions that have been requested within a configurable preset time period.

7. The method according to claim 1, wherein resources for privileged sessions are pre-reserved in the base station for the first time when detecting that a first privileged session connection has been established with the base station.

8. The method according to claim 1,
wherein based on the amount of unoccupied resources in the first base station being insufficient to compensate for the resources occupied by said established privileged session connection, pre-reserving the new resources in the first base station comprises releasing an ongoing privileged connection with the first base station.

9. The method according to claim 8, wherein said ongoing privileged connection is selected for release based on a level of activity of the ongoing privileged connection.

10. The method according to claim 8, wherein based on all ongoing sessions in the cell being setup for privileged sessions, said ongoing privileged connection is selected for release based on priorities which have been set for the privileged sessions and their connections in the cell.

11. A reservation function associated with a first base station serving a cell in a cellular network, the reservation function being configured to enable access to the first base station for privileged sessions, the reservation function comprising:
a detecting module adapted to detect that resources being pre-reserved in the first base station exclusively for privileged sessions are used for establishing a connection for a privileged session for a wireless terminal, and
a reserving module adapted to pre-reserve new resources in the first base station exclusively for privileged sessions in response to said detecting, to compensate for the resources occupied by the established privileged session connection, such that an amount of resources sufficient for enabling at least one subsequent privileged session connection remains pre-reserved in the first base station,
wherein the detecting module is further adapted to detect based on one of an EstablishmentCause information element in a connection request message from the wireless terminal, or an Allocation/Retention Priority, ARP, parameter from a core network which indicates a relative importance of a radio bearer of said privileged session as compared to other radio bearers used in the cell,
wherein the EstablishmentCause information element is a parameter indicating the privileged session in the connection request message.

12. The reservation function according to claim 11, wherein the reservation function is further adapted to send said information element during handover signalling to a second base station when the wireless terminal moves to a new cell served by the second base station, as a basis for performing said actions of detecting and pre-reserving in the second base station.

13. The reservation function according to claim 11,
wherein based on the amount of unoccupied resources in the first base station being insufficient to compensate for the resources occupied by said established privileged session connection, the reservation function is further adapted to pre-reserve the new resources in the first base station by releasing an ongoing privileged connection with the first base station.

14. The reservation function according to claim 13, wherein the reservation function is further adapted to select said ongoing privileged connection for release based on a level of activity of the ongoing privileged connection.

15. The reservation function according to claim 13, wherein based on all ongoing sessions in the cell being setup for privileged sessions, the reservation function is further adapted to select said ongoing privileged connection for release based on priorities which have been set for the privileged sessions and their connections in the cell.

16. A method in a reservation function associated with a first base station serving a cell in a cellular network, for enabling access to the first base station for privileged sessions, the method comprising:
detecting that resources being pre-reserved in the first base station exclusively for privileged sessions, are used for establishing a connection for a privileged session for a wireless terminal, and
pre-reserving new resources in the first base station exclusively for privileged sessions in response to said detecting, to compensate for the resources occupied by the established privileged session connection, such that an amount of resources sufficient for enabling at least one subsequent privileged session connection remains pre-reserved in the first base station,
wherein said amount of pre-reserved resources in the first base station is based on a number of privileged sessions that have been requested within a time period.

* * * * *